US012785973B2

(12) United States Patent
Choi et al.

(10) Patent No.: US 12,785,973 B2
(45) Date of Patent: Nov. 3, 2026

(54) MEMORY DEVICE WITH SHARED DATA STORE AND OPERATING METHOD THEREOF

(71) Applicant: SAMSUNG ELECTRONICS CO., LTD., Suwon-si (KR)

(72) Inventors: Byungchan Choi, Suwon-si (KR); Mingon Shin, Suwon-si (KR); Yejun Jeong, Suwon-si (KR); Seunghoon Kang, Suwon-si (KR); Youngjin Cho, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 52 days.

(21) Appl. No.: 18/936,330

(22) Filed: Nov. 4, 2024

(65) Prior Publication Data

US 2025/0310110 A1 Oct. 2, 2025

(30) Foreign Application Priority Data

Mar. 27, 2024 (KR) ........................ 10-2024-0041882

(51) Int. Cl.

*H04L 9/32* (2006.01)
*G06F 3/06* (2006.01)
*G06F 21/33* (2013.01)
*G06F 21/79* (2013.01)

(52) U.S. Cl.

CPC .................................. *H04L 9/3228* (2013.01)

(58) Field of Classification Search

CPC ........... H04L 9/3228; G06F 2221/2141; G06F 21/79; G06F 3/0622; G06F 3/0604; G06F 3/0608; G06F 3/0614; G06F 3/0658; G06F 3/0659; G06F 21/33; G06F 2212/1016; G06F 2212/1032; G06F 2212/1044; G06F 2212/1052

See application file for complete search history.

(56) References Cited

U.S. PATENT DOCUMENTS

| | | | |
|---|---|---|---|
| 10,923,203 B2 | 2/2021 | Park et al. | |
| 11,216,390 B2 | 1/2022 | Motoyama et al. | |
| 11,372,558 B2 | 6/2022 | Li et al. | |
| 12,242,379 B2 * | 3/2025 | Chitnis | G06F 12/0292 |

(Continued)

FOREIGN PATENT DOCUMENTS

| | | |
|---|---|---|
| JP | 2007-293576 A | 11/2007 |
| JP | 2013-156760 A | 8/2013 |

(Continued)

*Primary Examiner* — Darren B Schwartz
(74) *Attorney, Agent, or Firm* — Sughrue Mion, PLLC

(57) ABSTRACT

Disclosed is a memory device which includes a memory controller comprising a plurality of cores, each of the plurality of cores associated with a respective OTP access key; and a one-time programmable (OTP) memory comprising a plurality of regions, the plurality of regions being accessed only by respective cores, wherein the memory controller is configured to: assign a first access authority to access the first subset of regions and the second subset of regions to the first core based on a first OTP access key corresponding to the first core; and assign a second access authority to access the second subset of regions and the third subset of regions to the second core based on a second OTP access key corresponding to the second core.

20 Claims, 15 Drawing Sheets

(56) References Cited

U.S. PATENT DOCUMENTS

| | | | | |
|---|---|---|---|---|
| 2012/0331307 | A1* | 12/2012 | Fernandez Gutierrez | G06F 21/72 713/190 |
| 2014/0016776 | A1* | 1/2014 | Van Foreest | G06F 21/73 380/46 |
| 2014/0025903 | A1* | 1/2014 | Yamashita | G06F 12/1483 711/152 |
| 2014/0052975 | A1* | 2/2014 | Rodgers | G06F 21/602 713/2 |
| 2014/0359268 | A1* | 12/2014 | Jauhiainen | G06F 21/44 713/168 |
| 2015/0067287 | A1* | 3/2015 | Touzni | G06F 21/76 711/163 |
| 2015/0356308 | A1* | 12/2015 | Kim | G06F 21/629 726/1 |
| 2019/0220419 | A1* | 7/2019 | Lin | G06Q 50/184 |
| 2019/0333570 | A1* | 10/2019 | Kim | G11C 11/40622 |
| 2019/0391755 | A1* | 12/2019 | Lee | G06F 3/0679 |
| 2020/0007332 | A1* | 1/2020 | Girkar | H04L 9/3213 |
| 2022/0027464 | A1 | 1/2022 | Regner et al. | |
| 2023/0244821 | A1* | 8/2023 | Driscoll | H04L 9/0841 713/193 |
| 2023/0351056 | A1* | 11/2023 | Marando | G06F 21/72 |

FOREIGN PATENT DOCUMENTS

| | | | |
|---|---|---|---|
| JP | 2017-4293 | A | 1/2017 |
| KR | 10-2022-0077853 | A | 6/2022 |
| KR | 10-2432451 | B1 | 8/2022 |

* cited by examiner

FIG. 8B

113

| Key # | Corresponding Core | Accessible Regions | Auth |
|---|---|---|---|
| 1 | C1 | R1, R2 | X |
| 2 | C2 | R1, R3 | X |

806:Update OTP Access Table (113)

| Key # | Corresponding Core | Accessible Regions | Auth |
|---|---|---|---|
| 1 | C1 | R1, R2 | 0 |
| 2 | C2 | R1, R3 | X |

MEMORY DEVICE WITH SHARED DATA STORE AND OPERATING METHOD THEREOF

CROSS-REFERENCE TO RELATED APPLICATIONS

This application claims priority under 35 U.S.C. § 119 to Korean Patent Application No. 10-2024-0041882 filed on Mar. 27, 2024, in the Korean Intellectual Property Office, the disclosures of which are incorporated by reference herein in their entireties.

BACKGROUND

Embodiments of the present disclosure described herein relate to a semiconductor memory, and more particularly, relate to a memory device and an operating method thereof.

A semiconductor memory is classified as a volatile memory device, which loses data stored therein when a power is turned off, such as a static random access memory (SRAM), a dynamic RAM (DRAM), or a synchronous DRAM (SDRAM) or a nonvolatile memory, which retains data stored therein even when a power is turned off, such as a read only memory (ROM), a programmable ROM (PROM), an electrically programmable ROM (EPROM), an electrically erasable and programmable ROM (EEPROM), a flash memory device, a phase-change RAM (PRAM), a magnetic RAM (MRAM), a resistive RAM (RRAM), or a ferroelectric RAM (FRAM).

In particular, a nonvolatile memory, in which it is impossible to change data recorded therein, from among nonvolatile memories is called a one-time programmable (OTP) memory. The OTP memory is variously used as an embedded nonvolatile storage device which stores repair information of any other memory device, analog trimming information, a secure code, etc. Nowadays, various techniques or devices are being developed to improve the storage space efficiency of the OTP memory.

SUMMARY

Embodiments of the present disclosure provide a memory device with improved performance and an operating method thereof.

According to an embodiment, a memory device is provided. The memory device includes a one-time programmable (OTP) memory comprising a plurality of regions; a memory controller comprising more than one core, each of the more than one core associated with a respective OTP access key; and an OTP access controller configured to: assign a first access authority to a first core from the more than one core to access a first subset of regions from the plurality of regions based on a first OTP access key; and assign a second access authority to a second core from the more than one core to access a second subset of regions from the plurality of regions based on a second OTP access key, wherein the first subset of regions and the second subset of regions comprise a common region that can be accessed based on the first access authority and the second access authority.

According to an embodiment, an operating method of a memory device is provided. The operating method may include a memory controller and a one-time programmable (OTP) memory, and may include generating a first authentication code associated with access authentication for authenticating an access of a first core of the memory controller to the OTP memory, based on a first OTP access key corresponding to the first core; generating a second authentication code associated with the access authentication, based on a first authentication key stored in key region of the memory controller, the first authentication key corresponding to the first OTP access key; comparing the first authentication code and the second authentication code; and assigning an access authority to the first core to access a first subset of regions of the OTP memory, based on that the first authentication code and the second authentication code being equal, wherein the first subset of regions comprises a region storing sharing data that is shared by the first core and a second core of the memory controller.

According to an embodiment, a memory device is provided. The memory device may include a memory controller comprising a plurality of cores, each of the plurality of cores associated with a respective OTP access key; and a one-time programmable (OTP) memory comprising a plurality of regions, the plurality of regions including: a first subset of regions that stores data only a first core uses, a second subset of regions that stores data which the first core and a second core use, and a third subset of regions that stores data which only the second core uses, wherein the memory controller is configured to: assign a first access authority to access the first subset of regions and the second subset of regions to the first core based on a first OTP access key corresponding to the first core; and assign a second access authority to access the second subset of regions and the third subset of regions to the second core based on a second OTP access key corresponding to the second core.

BRIEF DESCRIPTION OF DRAWINGS

The above and other objects and features of the present disclosure will become apparent by describing in detail embodiments thereof with reference to the accompanying drawings.

FIGS. 8A and 8B are diagrams illustrating processes of access authentication according to an embodiment of the present disclosure.

DETAILED DESCRIPTION

Figure 1:
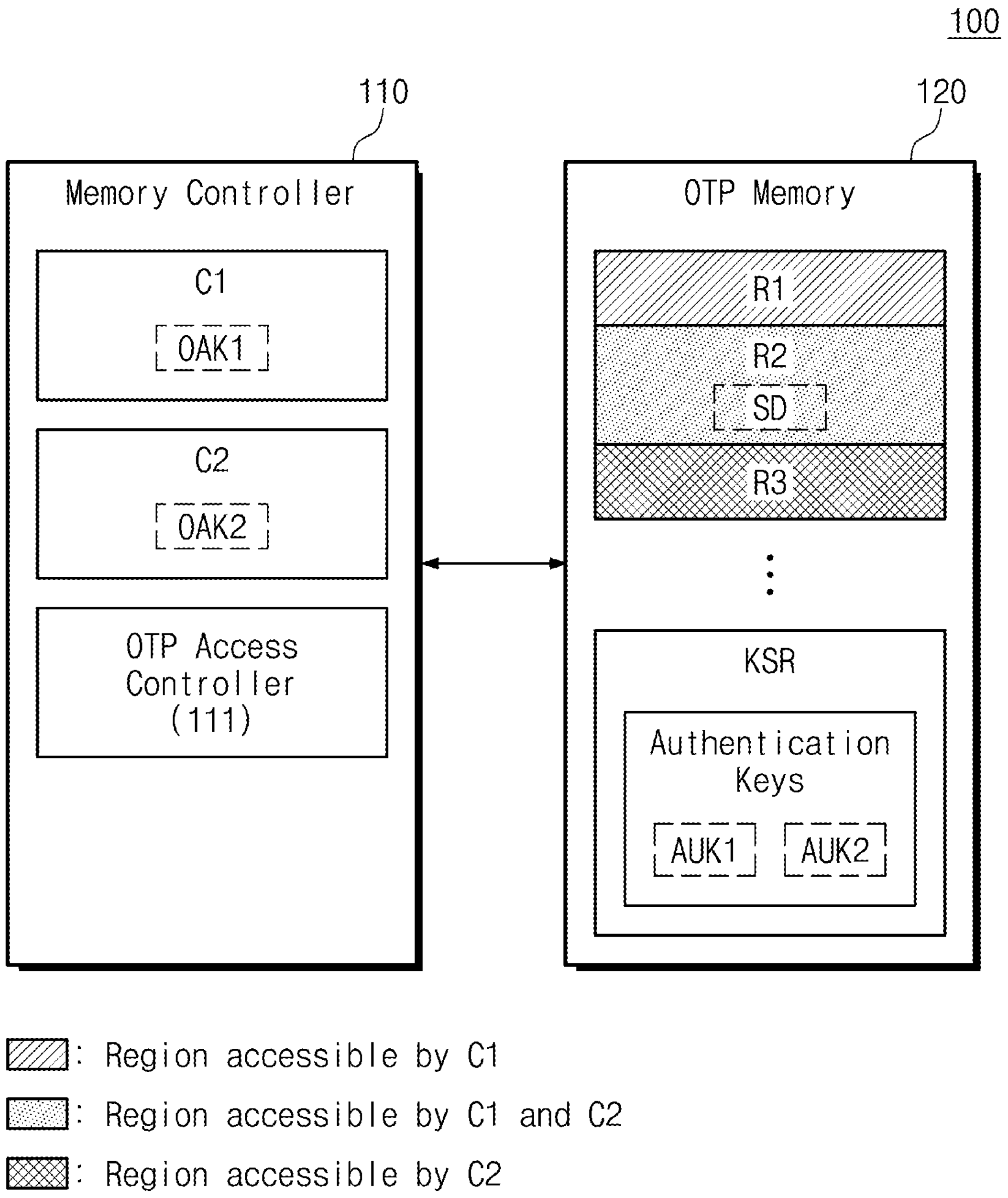
FIG. 1 is a block diagram illustrating a memory device according to an embodiment of the present disclosure.

Below, embodiments of the present disclosure will be described in detail and clearly to such an extent that one skilled in the art easily carries out the present disclosure.

In the specification, at least one of the blocks, logic, components, elements, modules and units (collectively "components" in this paragraph) represented by a block in the drawings such as FIGS. 1-3, 6, 8A, and 10A-13 may use a direct circuit structure, such as a memory, a processor, a logic circuit, a look-up table, etc. that may execute the respective functions through controls of one or more microprocessors or other control apparatuses. Also, at least one of these components may be specifically embodied by a module, a program, or a part of code, which contains one or more executable instructions for performing specified logic functions, and executed by one or more microprocessors or other control apparatuses. Further, at least one of these components may include or may be implemented by a processor such as a central processing unit (CPU), a microprocessor, or the like that performs the respective functions.

It will be understood that when an element is referred to as being "connected" with or to another element, it can be directly or indirectly connected to the other element.

Also, when a part "includes" or "comprises" an element, unless there is a particular description contrary thereto, the part may further include other elements, not excluding the other elements.

It will be understood that, although the terms first, second, third, etc., may be used herein to describe various elements, the disclosure should not be limited by these terms. These terms are only used to distinguish one element from another element.

As used herein, the singular forms "a," "an" and "the" are intended to include the plural forms as well, unless the context clearly indicates otherwise.

With regard to any method or process described herein, an identification code may be used for the convenience of the description but is not intended to illustrate the order of each step or operation. Each step or operation may be implemented in an order different from the illustrated order unless the context clearly indicates otherwise. One or more steps or operations may be omitted unless the context of the disclosure clearly indicates otherwise.

FIG. 1 is a block diagram illustrating a memory device according to an embodiment of the present disclosure. Referring to FIG. 1, a memory device 100 may include a memory controller 110 and a one-time programmable (OTP) memory 120.

The memory controller 110 may control all the operations of the memory device 100. For example, the memory controller 110 may store data in the OTP memory 120 may read data stored in the OTP memory 120. The memory controller 110 may include a first core C1, a second core C2, and an OTP access controller 111. FIG. 1 shows the case where the number of cores C1 and C2 included in the memory controller 110 is 2, but the present disclosure is not limited thereto.

The first core C1 and the second core C2 may control all the operations of the memory controller 110. The OTP access controller 111 may control the access of the cores C1 and C2 to the OTP memory 120. In other words, the first core C1 and the second core C2 may access the OTP memory 120 through the OTP access controller 111.

In a same or another embodiment, the first core C1 may correspond to a first OTP access key OAK1, and the second core C2 may correspond to a second OTP access key OAK2. The OTP access controller 111 may control the access of the cores C1 and C2 to the OTP memory 120 based on the OTP access keys OAK1 and OAK2.

The OTP memory 120 may be a memory incapable of additionally recording data after data are once recorded. That is, the data stored in the OTP memory 120 may be un-erasable. Also, the data stored in the OTP memory 120 may not be lost even though the power supplied to the OTP memory 120 is turned off. Meanwhile, the OTP memory 120 may include a plurality of regions. The plurality of regions may include first to third regions R1 to R3 and an authentication key storage region KSR.

For example, the OTP memory 120 may be programmed by breaking (e. g. removing) a connection of a fuse implemented in a circuit of the OTP memory 120 or by generating a connection of an anti-fuse implemented therein.

In a same or another embodiment, the first region R1 may be a region to which only the first core C1 is accessible. The second region R2 may be a region to which the first core C1 and the second core C2 are accessible in common. Also, the second region R2 may be a region in which sharing data SD which the first core C1 and the second core C2 share are stored. The third region R3 may be a region to which only the second core C2 is accessible. The authentication key storage region KSR may be a region to which the OTP access controller 111 is accessible.

In a same or another embodiment, the authentication key storage region KSR may be a region where authentication keys are stored. The authentication keys may include a first authentication key AUK1 and a second authentication key AUK2.

In a same or another embodiment, the sharing data SD may include at least some of secure provisioning data, data for prevention of a rollback to a firmware version, firmware-related key revocation information.

The authentication keys AUK1 and AUK2 may be used to authenticate the authority for the cores C1 and C2 to access the regions R1 to R3 of the OTP memory 120. In a same or another embodiment, the first authentication key AUK1 may be the same as the first OTP access key OAK1. Also, the second authentication key AUK2 may be the same as the second OTP access key OAK2. That is, the cores C1 and C2 and the OTP memory 120 may share the same key.

In a same or another embodiment, the OTP access controller 111 may determine that the first core C1 corresponds to the first OTP access key OAK1, based on the first authentication key AUK1. The OTP access controller 111 may assign a first access authority to access the first region R1 and the second region R2 of the OTP memory 120 to the first core C1, based on that the first core C1 corresponds to the first OTP access key OAK1.

As an example, the OTP access controller 111 may compare the first OTP access key OAK1 obtained by the first core C1 with the first authentication key AUK1 stored in the OTP memory 120. When the first authentication key AUK1 and the first OTP access key OAK1 coincide with each other, the OTP access controller 111 may assign the first access authority to the first core C1.

Also, the OTP access controller 111 may determine that the second core C2 corresponds to the second OTP access key OAK2, based on the second authentication key AUK2. The OTP access controller 111 may assign a second access authority to access the second region R2 and the third region R3 of the OTP memory 120 to the second core C2, based on that the second core C2 corresponds to the second OTP access key OAK2.

As an example, the OTP access controller 111 may compare the second OTP access key OAK2 obtained by the second core C2 with the second authentication key AUK2 stored in the OTP memory 120. When the second authentication key AUK2 and the second OTP access key OAK2 coincide with each other, the OTP access controller 111 may assign the second access authority to the second core C2.

Meanwhile, as described above, the second region R2 may be a region in which the sharing data SD shared by the first core C1 and the second core C2 are stored. Accordingly, the sharing data SD may not be unnecessarily stored in the first region R1 and the third region R3 in duplicate.

In other words, according to a same or another embodiment of the present disclosure, the OTP access controller 111 may distinguish regions (e.g., R1 and R2) of the OTP memory 120, which are accessible by the first core C1, from regions (e.g., R2 and R3) of the OTP memory 120, which are accessible by the second core C2, based on the authentication keys AUK1 and AUK2 and the OTP access keys OAK1 and OAK2. In this case, the OTP access controller 111 may allow both the first core C1 and the second core C2 to access a specific region (e.g., R2) where the sharing data SD are stored. Accordingly, there may be no need to store the sharing data SD in memory regions (e.g., R1 and R3) in duplicate. This may mean that the storage space efficiency of the OTP memory 120 is improved.

Figure 2:
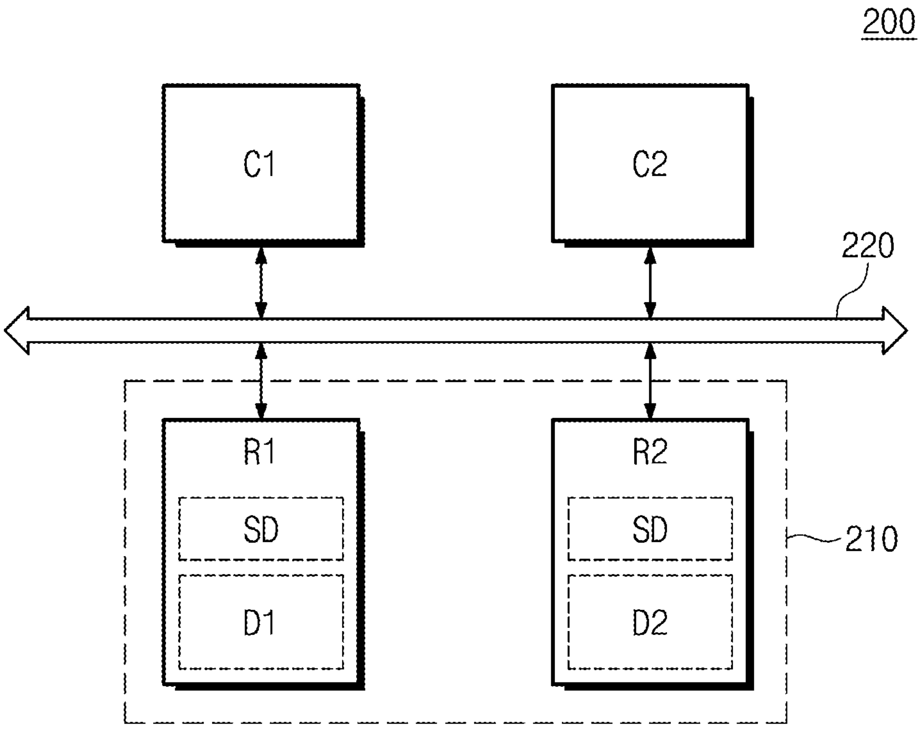
FIG. 2 is a block diagram illustrating a memory device in related art.

FIG. 2 is a block diagram for describing an example of a memory device. Referring to FIG. 2, a memory device 200 may include the first core C1, the second core C2, an OTP memory 210, and a system bus 220. The OTP memory 210 may include the first region R1 and the second region R2.

The first core C1 and the second core C2 may be directly connected to the OTP memory 210 through the system bus 220 and may be inaccessible to a specific region of the OTP memory 210 in common. Specifically, the first core C1 may be connected to the first region R1 through the system bus 220. The second core C2 may be connected to the second region R2 through the system bus 220. That is, the first core C1 may only access the first region R1, and the second core C2 may only access the second region R2. That is, a data path through which the first core C1 accesses the first region R1 may be different from a data path through which the second core C2 accesses the second region R2.

In other words, the first region R1 of the OTP memory 210, to which the first core C1 is accessible, and the second region R2 of the OTP memory 210, to which the second core C2 is accessible, may be physically separated from each other. Also, there may be no region of the OTP memory 210, to which the first core C1 and the second core C2 are accessible in common.

The sharing data SD and first data D1 may be stored in the first region R1. The sharing data SD and second data D2 may be stored in the second region R2. The sharing data SD may be data which are shared by the first core C1 and the second core C2. The first data D1 may be data which are used only by the first core C1. The second data D2 may be data which are used only by the second core C2.

As described above, a region to which the first core C1 and the second core C2 are accessible in common may be absent from the OTP memory 210. Both the first core C1 and the second core C2 should access the sharing data SD. Accordingly, the sharing data SD should be stored in both the first region R1 and the second region R2. As the sharing data SD are stored in the regions R1 and R2 of the OTP memory 210 in duplicate, the entire storage space of the OTP memory 210 may be insufficient.

As described with reference to FIG. 1, according to an embodiment of the present disclosure, the memory device 100 (refer to FIG. 1) may designate a specific region R2 (refer to FIG. 1) of the OTP memory 120 (refer to FIG. 1) as a region to which the cores C1 and C2 (refer to FIG. 1) are accessible in common. The memory device 100 (refer to FIG. 1) may store the sharing data SD in the specific region (e.g., R2 of FIG. 1). Accordingly, the memory device 100 (refer to FIG. 1) may not store the sharing data SD in the regions R1 and R3 (refer to FIG. 1) of the OTP memory 120 (refer to FIG. 1) in duplicate. This may mean that the storage space efficiency of the OTP memory 120 (refer to FIG. 1) is improved.

Figure 3:
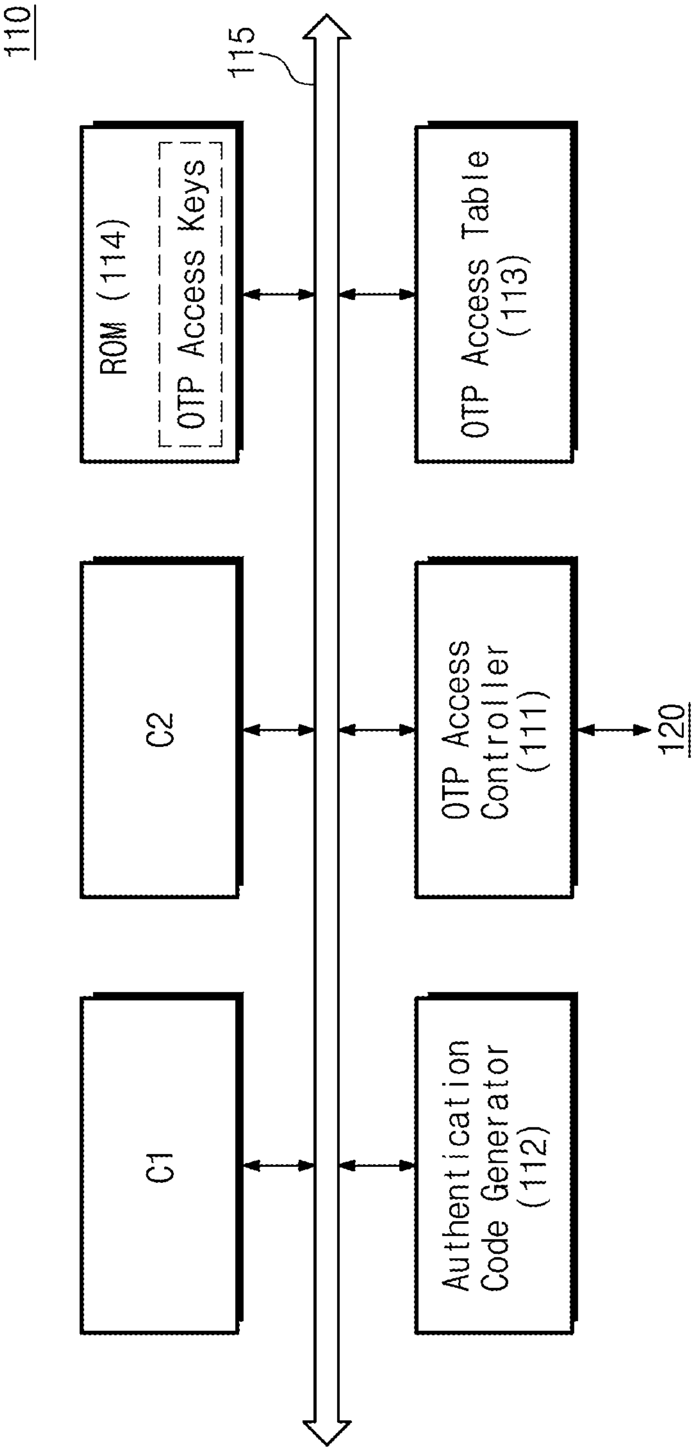
FIG. 3 is a block diagram for describing a memory controller of FIG. 1 according to an embodiment of the present disclosure.

FIG. 3 is a block diagram for describing a memory controller of FIG. 1 in further detail. Referring to FIG. 3, the memory controller 110 may include the first core C1, the second core C2, the OTP access controller 111, an authentication code generator 112, an OTP access table 113, a read only memory (ROM) 114, and a system bus 115.

The first core C1 and the second core C2 may control all the operations of the memory controller 110. The first core C1 and the second core C2 may access the OTP memory 120 through the OTP access controller 111. For example, through the OTP access controller 111 and the system bus 115, the first core C1 and the second core C2 may store data in the OTP memory 120 or may read data stored in the OTP memory 120.

In a same or another embodiment, the first core C1 may include a secure core. The first core C1 may be implemented to perform security-related operations. The first core C1 may be implemented to provide more improved security than the second core C2. For example, when the first core C1 is a secure core, secure sensitive parameters, security information, etc. may be stored in the first region R1 of the OTP memory 120.

The OTP access controller 111 may control the access of the first and second cores C1 and C2 to the OTP memory 120. The OTP access controller 111 may perform access authentication for the OTP memory 120 for each of the first core C1 and the second core C2. Particularly, according to an embodiment, the OTP access controller 111 may check an OTP access key corresponding to each of the first core C1 and the second core C2. The OTP access controller 111 may assign the authority to access a region(s) of the OTP memory 120 based on the check result, for each of the first core C1 and the second core C2.

The authentication code generator 112 may generate an authentication code for performing access authentication for the first and second cores C1 and C2. For example, the OTP access controller 111 may check an OTP access key corresponding to the first core C1 based on the authentication code generated by the authentication code generator 112.

The OTP access table 113 may include information about the first core C1 and the second core C2. For example, the OTP access table 113 may include information about a region of the OTP memory 120, which each of the first and second cores C1 and C2 is accessible, and information about whether the access authentication for the first and second cores C1 and C2 is completed. FIG. 3 shows that the OTP access table 113 is present outside the OTP access controller 111, but the present disclosure is not limited thereto. In an embodiment, the OTP access table 113 may be included in the OTP access controller 111.

The ROM 114 may be used as a read only memory which stores information necessary for the operation of the memory controller 110. The ROM 114 may store OTP access keys (e.g., OAK1 and OAK2 of FIG. 1) respectively corresponding to the first and second cores C1 and C2. For example, the ROM 114 may store a boot code, a firmware, etc. which are necessary to boot up the memory device 100. In an embodiment, the OTP access keys OAK1 and OAK2 may be included in the boot code or the firmware code stored in the ROM 114.

In a same or another embodiment, when the memory controller 110 is powered on, each of the first and second cores C1 and C2 may read the boot code stored in the ROM 114 and may obtain an OTP access key.

The system bus 115 may connect the components of the memory controller 110. That is, the components of the memory controller 110 may communicate with each other through the system bus 115. For example, the system bus 115 may include various system buses such as an advanced system bus (ASB), an advanced peripheral bus (APB), an advanced high performance bus (AHB), and an advanced extensible interface (AXI).

In a same or another embodiment, the first core C1 and the second core C2 may share a data path for accessing the OTP memory 120. For example, the first core C1 may access the OTP memory 120 through the system bus 115 and the OTP access controller 111. Also, the second core C2 may access the OTP memory 120 through the system bus 115 and the OTP access controller 111. In other words, the data path which is used for the first core C1 to access the OTP memory 120 may be the same as the data path which is used for the second core C2 to access the OTP memory 120.

That is, according to a same or another embodiment of the present disclosure, the data path for accessing the OTP memory 120 may be shared by the first and second cores C1 and C2. Accordingly, the sharing data SD (refer to FIG. 1) may be stored in a specific region (e.g., the second region R2 of FIG. 1) without being stored in a plurality of regions of the OTP memory 120 in duplicate. Meanwhile, regions to which the first and second cores C1 and C2 among the regions of the OTP memory 120 are accessible may be distinguished under control of the OTP access controller 111. This may mean that the storage space efficiency of the OTP memory 320 is improved.

In a same or another embodiment, each of various components included in the memory controller 110 may be implemented with an intellectual property (IP) block or a function block and may be implemented in the form of software, hardware, or firmware, or in the form of a combination thereof.

Figure 4:
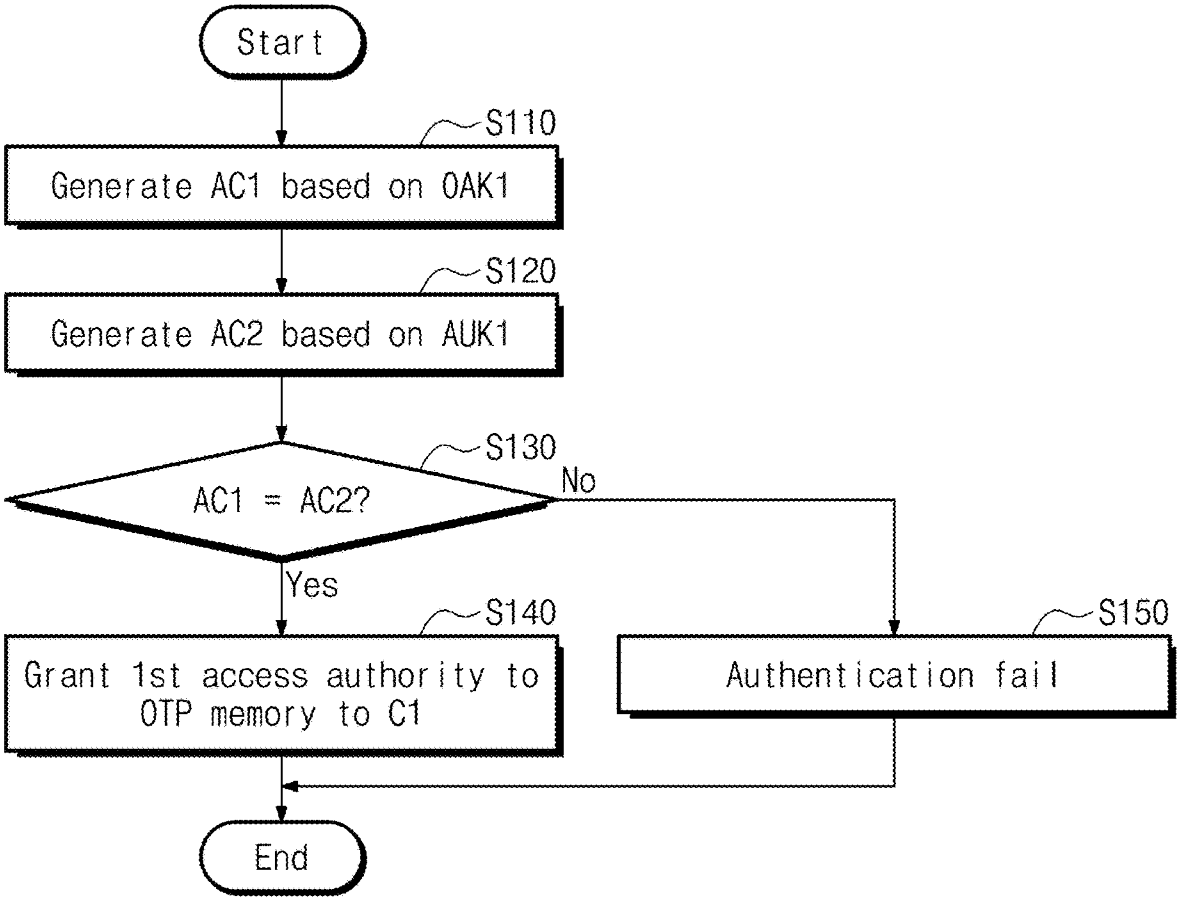
FIG. 4 is a flowchart illustrating a process of access authentication of a memory controller of FIG. 1 according to an embodiment of the present disclosure.

FIG. 4 is a flowchart for describing access authentication of a memory controller of FIG. 1. FIG. 4 will be described with reference to FIGS. 1 and 3. FIG. 4 shows a method of authenticating an access of the first core C1. However, the present disclosure is not limited thereto. For example, access authentication for the second core C2 is performed by the method illustrated in FIG. 4. Referring to FIG. 4, in operation S110, the memory controller 110 may generate first authentication code AC1. For example, the first authentication code AC1 may include information about the first OTP access key OAK1 corresponding to the first core C1. For example, the authentication code generator 112 may generate the first authentication code AC1 based on the first OTP access key OAK1. Operation S110 will be described with reference to FIGS. 5 and 6.

In operation S120, the memory controller 110 may generate a second authentication code AC2. The OTP access controller 111 may generate the second authentication code AC2 based on the first authentication key AUK1 corresponding to the first OTP access key OAK1 and stored in the OTP memory 120.

In operation S130, the memory controller 110 may compare the first authentication code AC1 and the second authentication code AC2. For example, the OTP access controller 111 may compare the first authentication code AC1 and the second authentication code AC2.

When the first authentication code AC1 and the second authentication code AC2 coincide with each other, the memory controller 110 may perform operation S140. When the first authentication code AC1 and the second authentication code AC2 do not coincide with each other, the memory controller 110 may perform operation S150.

In operation S140, the memory controller 110 may assign a first access authority to access the OTP memory 120 to the first core C1. As an example, the OTP access controller 111 may determine that the first OTP access key OAK1 corresponding to the first core C1 is the same as the first authentication key AUK1 stored in the OTP memory 120. The OTP access controller 111 may assign the first access authority to the first core C1, based on the check result. For example, the first access authority may be an authority to access the first region R1 and the second region R2 of the OTP memory 120. In other words, the OTP access controller 111 may assign the first access authority to access the first region R1 and the second region R2 of the OTP memory 120 to the first core C1, based on the first OTP access key OAK1.

In operation S150, the memory controller 110 may determine whether the access authentication is failed. For example, the OTP access controller 111 may determine that the access authentication for the first core C1 is failed and may not assign the authority to access the OTP memory 120 to the first core C1. In a same or another embodiment, the OTP access controller 111 may transmit a message, which provides notification that the access authentication is failed, to the first core C1.

As described above, the OTP access controller 111 according to an embodiment of the present disclosure may assign the authority to access regions of the OTP memory 120 to the first and second cores C1 and C2, based on OTP access keys.

Figure 5:
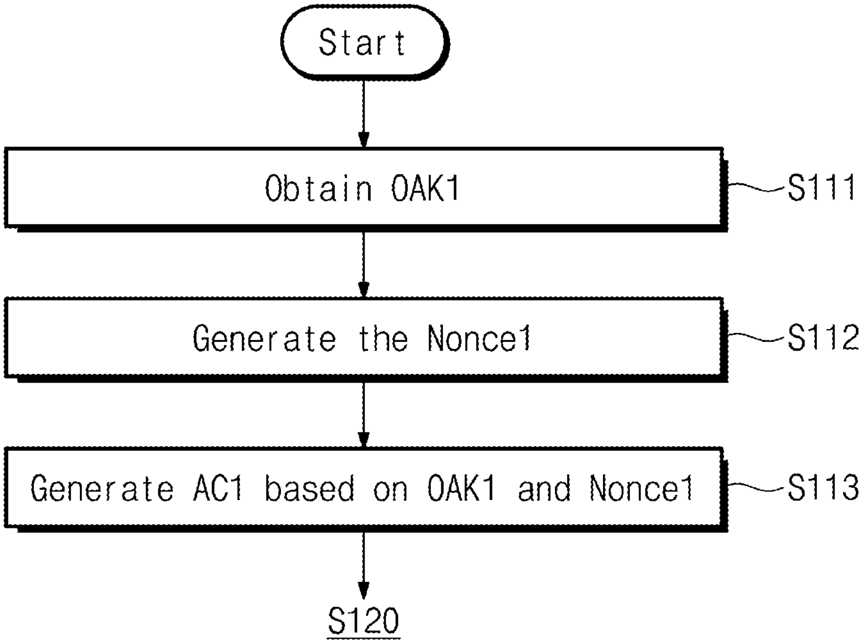
FIG. 5 is a flowchart illustrating a process of generating an authentication code according to an embodiment of the present disclosure.

FIG. 5 is a flowchart for describing operation S110 of FIG. 4 in further detail. Referring to FIG. 5, in operation S111, the memory controller 110 may obtain the first OTP access key OAK1. In embodiments, the first core C1 may obtain the first OTP access key OAK1 stored in the ROM 114.

In operation S112, the memory controller 110 may generate a first nonce Nonce1. The nonce may indicate unique and random string data meaning a "number used once". For example, the first core C1 may generate the first nonce Nonce1.

In operation S113, the memory controller 110 may generate the first authentication code AC1 based on the first nonce Nonce1 and the first OTP access key OAK1. In a same or another embodiment, the authentication code generator 112 may generate the first authentication code AC1 by performing a hash operation on the first nonce Nonce1 and the first OTP access key OAK1.

In a same or another embodiment, the authentication code generator 112 may generate the first authentication code AC1 by using a hash-based message authentication code (HMAC) algorithm.

Figure 6:
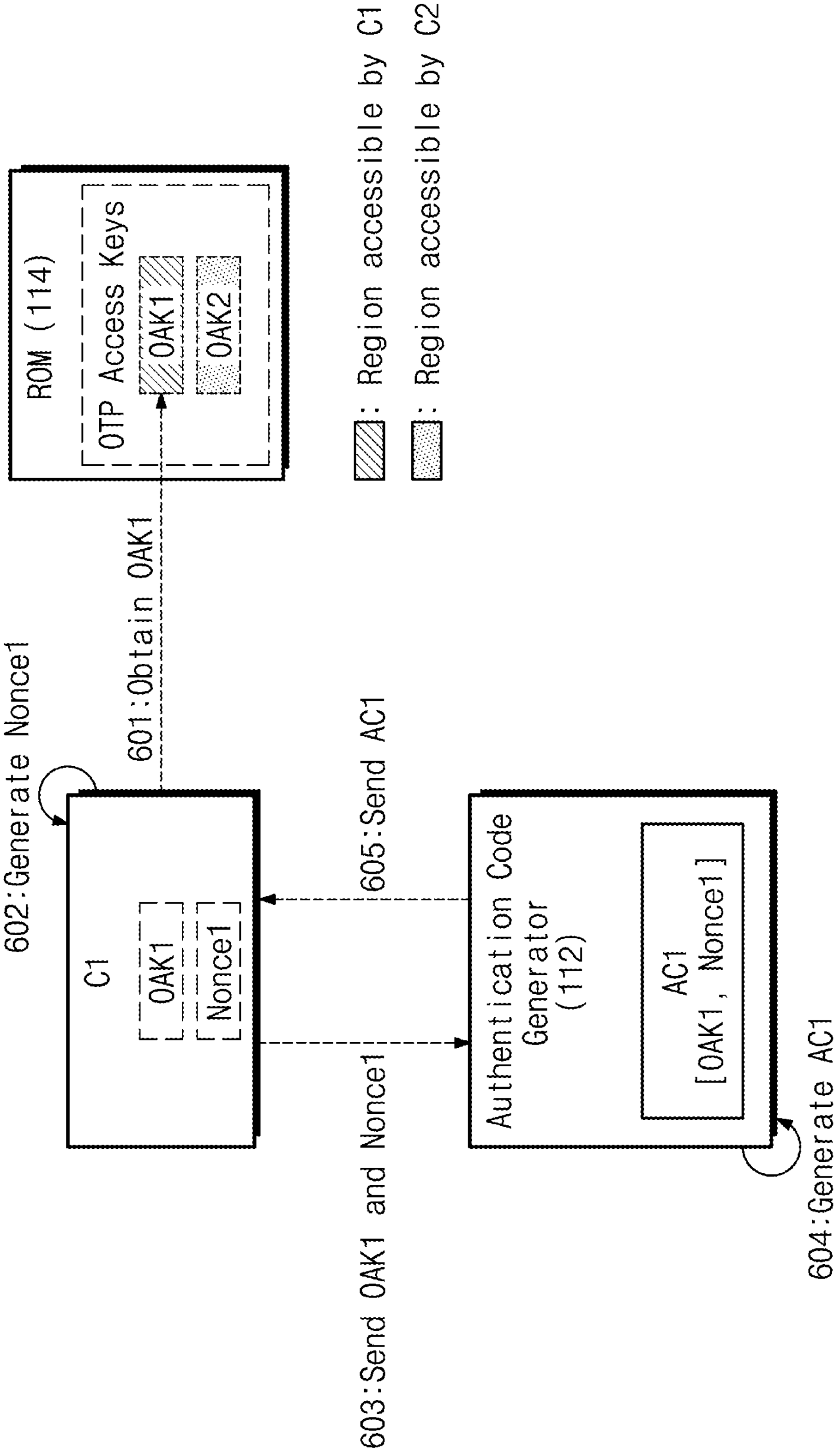
FIG. 6 is a diagram illustrating generating an authentication code according to an embodiment of the present disclosure.

FIG. 6 is a diagram for describing operation S110 of FIG. 4 in further detail. In FIG. 6, the components of the memory controller 110 may communicate with each other through the system bus 115 (refer to FIG. 3). Referring to FIG. 6, the OTP access keys OAK1 and OAK2 may be stored in advance in the ROM 114. For example, the first OTP access key OAK1 may be stored in a region of the ROM 114, which is only accessible by the first core C1. The second OTP access key OAK2 may be stored in a region of the ROM 114, which is only accessible by the second core C2.

In operation 601, the first core C1 may obtain the first OTP access key OAK1. For example, the first core C1 may perform the read operation on the ROM 114 and may obtain the first OTP access key OAK1. In an embodiment, the first OTP access key OAK1 may be stored in advance in the boot code or the firmware code associated with the first core C1. In other words, the first OTP access key OAK1 may be stored in a region, which is only accessible by the first core C1, from among regions of the ROM 114. In a same or another embodiment, when the memory device 100 is powered on, the first core C1 may read the boot code or the firmware code stored in the ROM 114 and may obtain the first OTP access key OAK1.

In other words, the second OTP access key OAK2 may be stored in a region, which is only accessible by the second core C2, from among the regions of the ROM 114.

After the first core C1 obtains the first OTP access key OAK1, in operation 602, the first core C1 may generate the first nonce Nonce1.

In operation 603, the first core C1 may send the first OTP access key OAK1 and the first nonce Nonce1 to the authentication code generator 112.

In operation 604, the authentication code generator 112 may generate the first authentication code AC1. For example, the authentication code generator 112 may generate the first authentication code AC1 by performing a hash operation on the first OTP access key OAK1 and the first nonce Nonce1. As described above, in an embodiment, the authentication code generator 112 may generate the first authentication code AC1 by using the HMAC algorithm.

In operation 605, the authentication code generator 112 may send the first authentication code AC1 thus generated to the first core C1. Accordingly, the first core C1 may obtain the first authentication code AC1.

Figure 7:
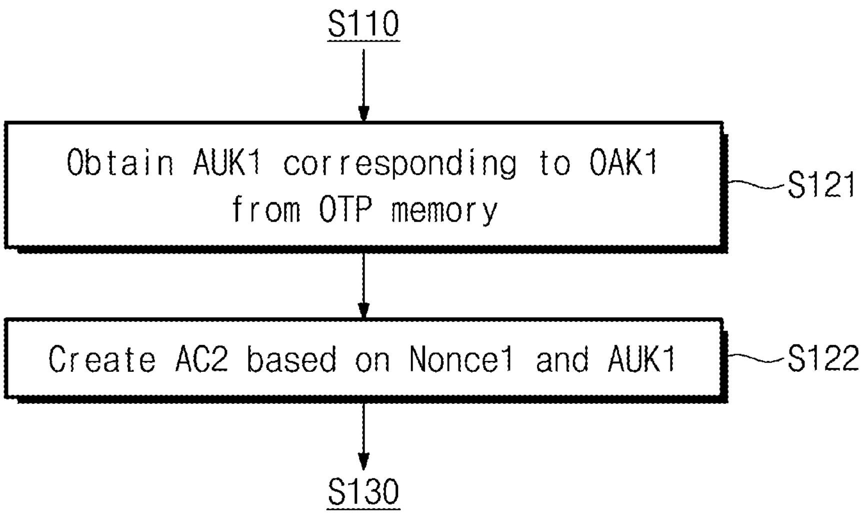
FIG. 7 is a flowchart illustrating a process of generating an authentication code according to an embodiment of the present disclosure.

FIG. 7 is a flowchart for describing operation S120 of FIG. 4 in further detail. In operation S121, the memory controller 110 may obtain the first authentication key AUK1 corresponding to the first OTP access key OAK1. In an embodiment, the OTP access controller 111 may perform the read operation on the OTP memory 120 and may obtain the first authentication key AUK1 stored in advance in the OTP memory 120. In a same or another embodiment, the first authentication key AUK1 may be the same as the first OTP access key OAK1.

In operation S122, the memory controller 110 may generate the second authentication code AC2 based on the first nonce Nonce1 and the first authentication key AUK1. In an embodiment, the OTP access controller 111 may obtain the first nonce Nonce1 from the first core C1. The OTP access controller 111 may generate the second authentication code AC2 by performing a hash operation on the first authentication key AUK1 and the first nonce Nonce1. In a same or another embodiment, the OTP access controller 111 may generate the second authentication code AC2 by using the HMAC algorithm.

Figure 8A:
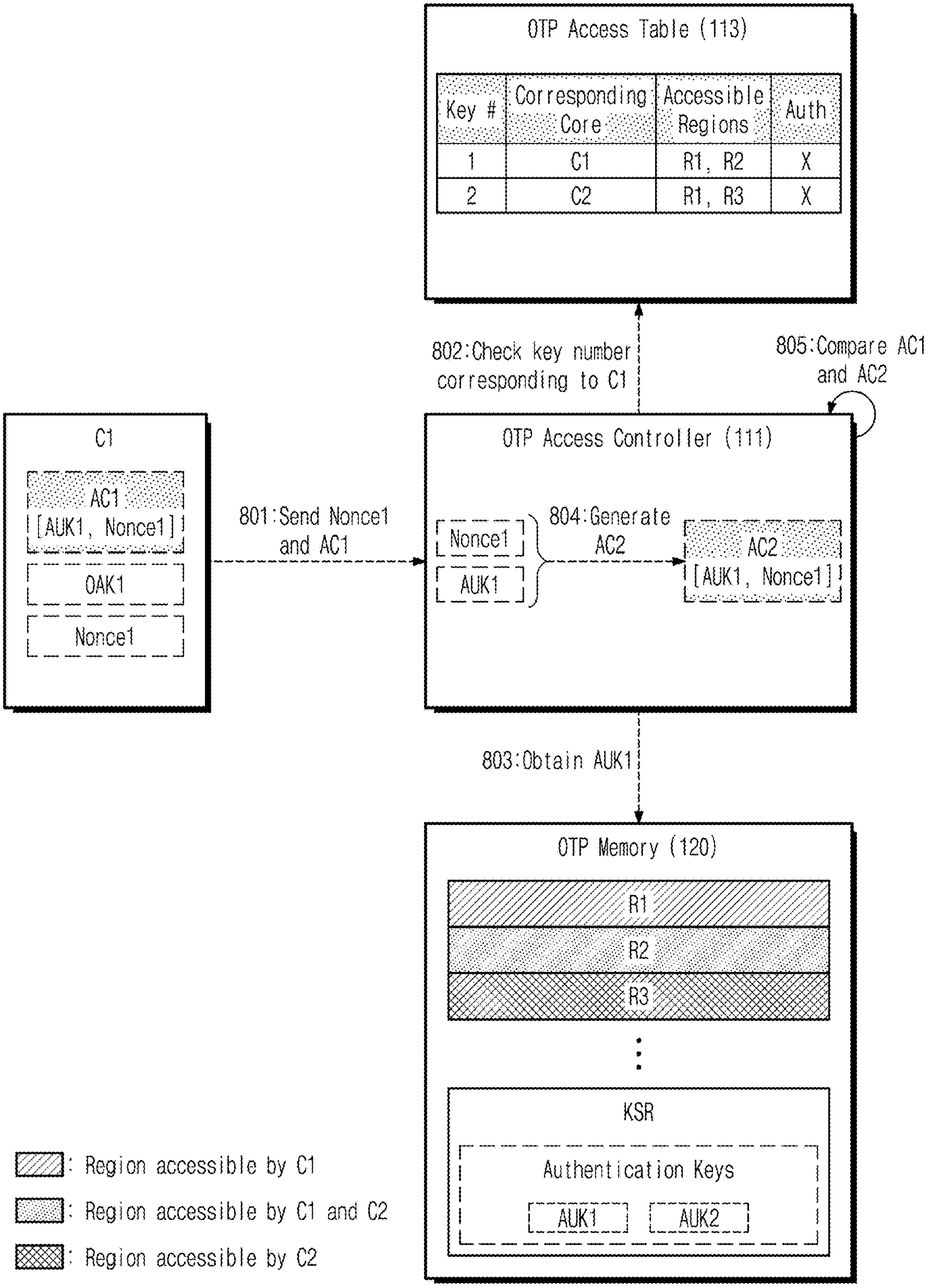

FIGS. 8A and 8B are diagrams for describing operation S120 and operation S130 of FIG. 4 in further detail. In FIGS. 8A and 8B, for example, the components of the memory controller 110 may communicate with each other through the system bus 115 (refer to FIG. 3). Referring to FIG. 8A, in operation 801, the first core C1 may send the first nonce Nonce1 and the first authentication code AC1 to the OTP access controller 111.

In operation 802, the OTP access controller 111 may check a key number Key # corresponding to the first core C1. In an embodiment, the OTP access controller 111, may check the key number Key # corresponding to the first core C1 by referring to the OTP access table 113. For example, the key number Key # may mean a number corresponding to an OTP access key OAK and an authentication key AUK. In the example of FIGS. 8A and 8B, the OTP access controller 111 may determine that the key number Key # corresponding to the first core C1 is “1”. To perform access authentication for the first core C1, in this case, the OTP access controller 111 may determine that the first authentication key AUK1 is required.

In a same or another embodiment, through a source address which is used to send the first nonce Nonce1 and the first authentication code AC1 through the system bus 115 (refer to FIG. 3), the OTP access controller 111 may determine that a target of the access authentication is the first core C1.

In a same or another embodiment, the OTP access table 113 may include a key number corresponding to each of the first and second cores C1 and C2, information about regions of the OTP memory 120, which are capable of being respectively accessed by the first and second cores C1 and C2, and information about whether the access authentication for each of the first and second cores C1 and C2 is completed.

In operation 803, the OTP access controller 111 may generate the first authentication key AUK1. In an embodiment, the OTP access controller 111 may perform the read operation on the authentication key storage region KSR of the OTP memory 120 and may obtain the first authentication key AUK1.

In a same or another embodiment, the authentication key storage region KSR may be a region which is accessible only by the OTP access controller 111. However, the present disclosure is not limited thereto.

In operation 804, the OTP access controller 111 may generate the second authentication code AC2. In an embodiment, the OTP access controller 111 may generate the second authentication code AC2 by performing a hash operation on the first authentication key AUK1 and the first nonce Nonce1.

In operation 805, the OTP access controller 111 may compare the first authentication code AC1 and the second authentication code AC2. As described above, the first authentication code AC1 may be generated based about the first OTP access key OAK1 and the first nonce Nonce1. The second authentication code AC2 may be generated based on the first nonce Nonce1 and the first authentication key AUK1. The first OTP access key OAK1 may be the same as the first authentication key AUK1. Accordingly, the first authentication code AC1 may be the same as the second authentication code AC2. That is, based on that the first authentication code AC1 and the second authentication code AC2 coincide with each other, the OTP access controller 111 may determine that the first OTP access key OAK1 and the first authentication key AUK1 coincide with each other.

Referring to FIG. 8B, when the first authentication code AC1 and the second authentication code AC2 coincide with each other, in operation 806, the OTP access controller 111 may update the OTP access table 113. In an embodiment, the OTP access controller 111 may update the OTP access table 113 to indicate that the access authentication for the first core C1 is completed. Accordingly, the first access authority to access the first and second regions R1 and R2 of the OTP memory 120 may be assigned to the first core C1.

As described with reference to FIG. 1, the first region R1 and the second region R2 of the OTP memory 120 are regions in which the access authority is assigned to the first core C1 whose access authentication is completed. Also, the second region R2 and the third region R3 of the OTP memory 120 are regions in which the access authority is assigned to the second core C2 whose access authentication is completed. Meanwhile, the second region R2 is a region where the sharing data SD shared by the first and second cores C1 and C2 are stored. Accordingly, according to an embodiment of the present disclosure, the sharing data SD may be prevented from being stored in regions (e.g., R1 to R3) of the OTP memory 120 in duplicate. This may mean that the storage space efficiency of the OTP memory 120 is improved.

Figure 9:
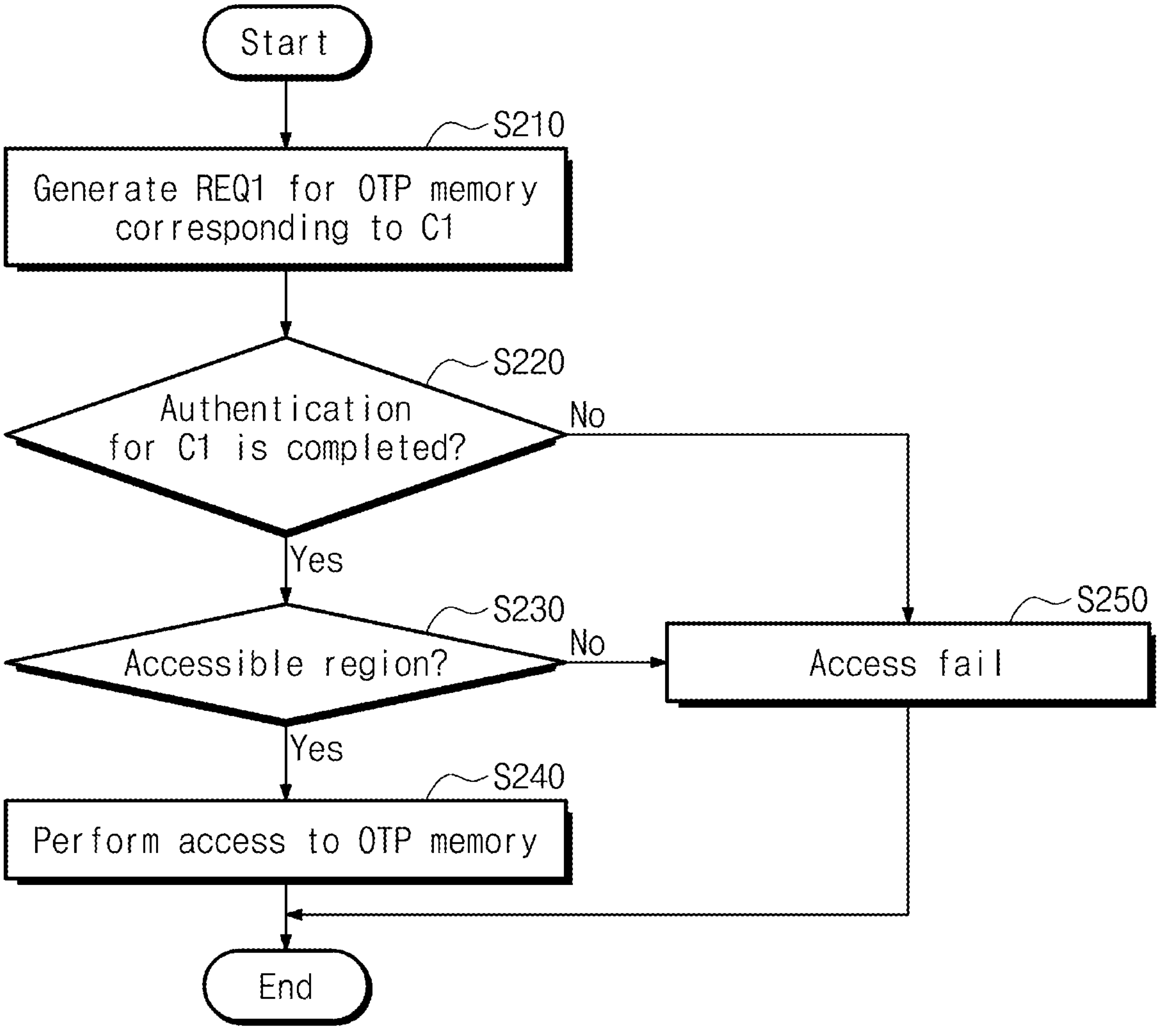
FIG. 9 is a flowchart illustrating a process for accessing an OTP memory according to an embodiment of the present disclosure.

FIG. 9 is a flowchart for describing how a memory controller of FIG. 1 accesses an OTP memory. Referring to FIG. 9, in operation S210, the memory controller 110 may generate a first request REQ1 for the OTP memory 120. For example, the first request REQ1 may be a request associated with the read or write operation of the OTP memory 120. In particular, as an example, the first core C1 may generate the first request REQ1 for the OTP memory 120.

In operation S220, the memory controller 110 may determine whether access authentication for the first core C1 is completed. In an embodiment, the OTP access controller 111 may check the OTP access table 113 to determine whether the access authentication for the first core C1 is completed. When the access authentication for the first core C1 is completed, the memory controller 110 may perform operation S230. When the access authentication for the first core C1 is not completed, the memory controller 110 may perform operation S250.

In operation S230, the memory controller 110 may determine whether a memory region corresponding to the first request REQ1 is a region accessible by the first core C1. Specifically, in an embodiment, the OTP access controller 111 may determine whether an address corresponding to the first request REQ1 is an address belonging to the first region R1 or the second region R2 of the OTP memory 120.

In operation S240, the memory controller 110 may access the OTP memory 120. Specifically, in an embodiment, the first request REQ1 may be a request for the read operation associated with an address belonging to the first region R1. In this case, the OTP access controller 111 may perform the read operation on the first region R1.

In operation S250, the memory controller 110 may determine that the access to the OTP memory 120 is failed. In an embodiment, the OTP access controller 111 may determine that the first core C1 does not have the authority to access a region of the address corresponding to the first request REQ1. Accordingly, the OTP access controller 111 may not permit the access of the first core C1 to the OTP memory 120.

Figure 10A:
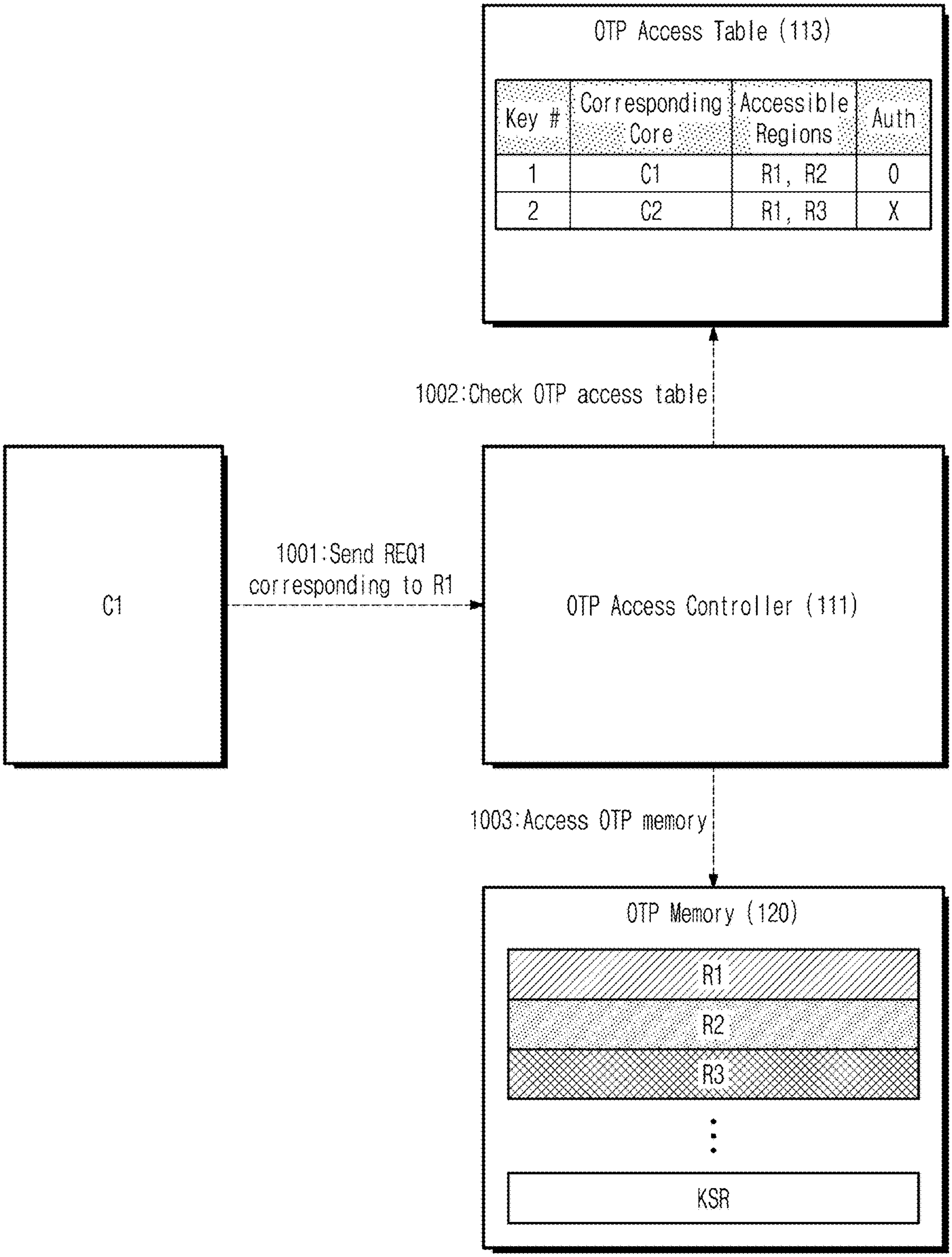
FIGS. 10A and 10B are diagrams illustrating accessing of an OTP memory by a memory controller according to an embodiment of the present disclosure.
Figure 10B:
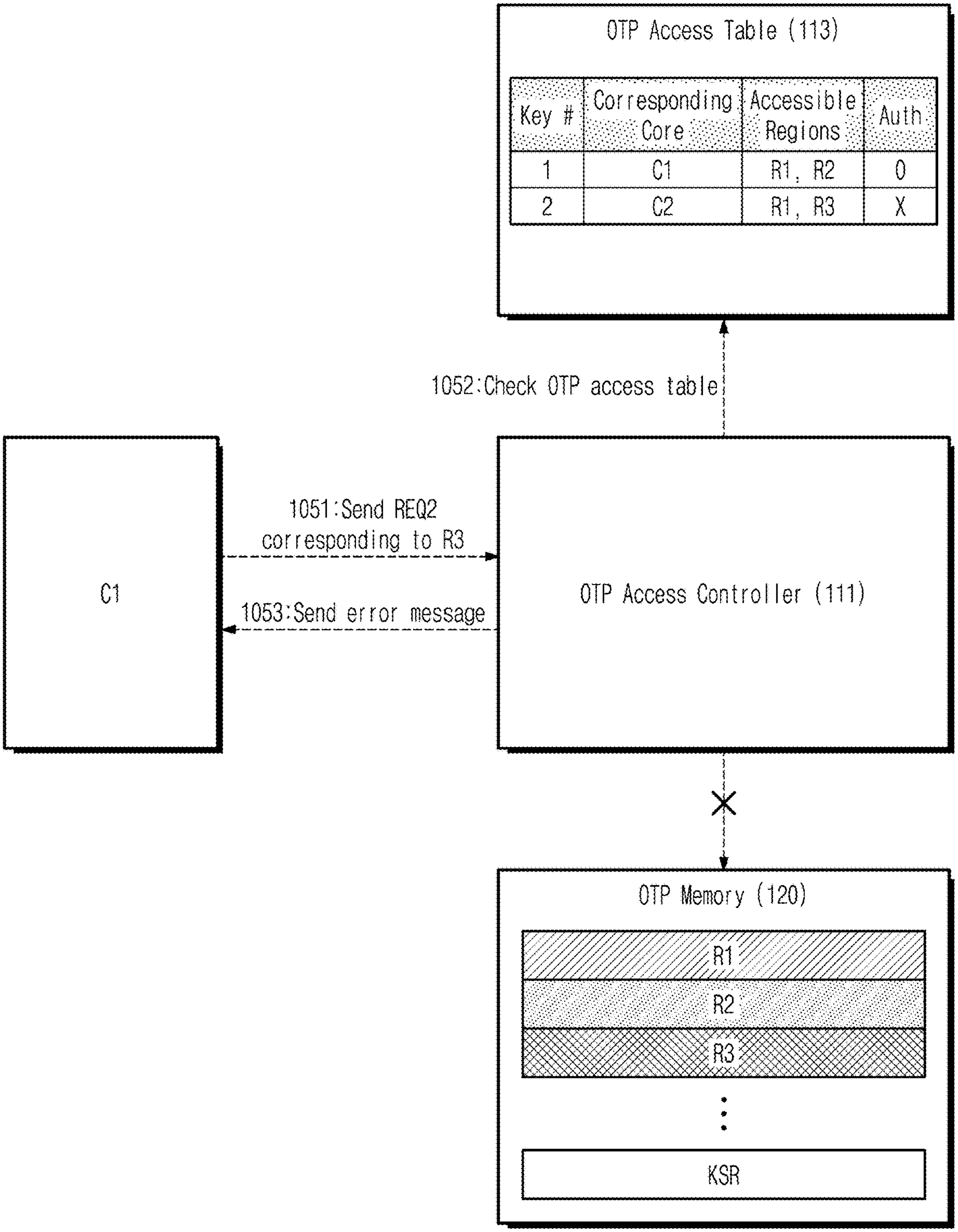

FIGS. 10A and 10B are diagrams for describing an operation of FIG. 9 in further detail. In FIGS. 10A and 10B, the components of the memory controller 110 may communicate with each other through the system bus 115 (refer to FIG. 3). FIGS. 10A and 10B are diagrams for describing the access to the OTP memory 120 in further detail. Referring to FIG. 10A, in operation 1001, the first core C1 may send the first request REQ1 to the OTP access controller 111. The first request REQ1 may be a request corresponding to the first region R1 of the OTP memory 120. For example, the first request REQ1 may be a read or write request for the first region R1.

In operation 1002, the OTP access controller 111 may check the OTP access table 113. The first core C1 may be in a state where the access authentication described with reference to FIGS. 4 to 8B is completed. Accordingly, the OTP access table 113 include information indicating a state where the access authentication for the first core C1 is completed.

For example, the OTP access controller 111 may check a source address of the first request REQ1. In a same or another embodiment, the OTP access table 113 may include a source address and information about a core corresponding to the source address. The OTP access controller 111 may determine that the first request REQ1 is a request sent from the first core C1, based on the source address and the OTP access table 113. Also, the OTP access controller 111 may check the OTP access table 113 and may determine that the first core C1 is a core whose access authentication is completed. In addition, the OTP access controller 111 may determine that the first core C1 has the authority to access a region of an address corresponding to the first request REQ1 (e.g., a region of an address belonging to the first region R1).

In operation 1003, the OTP access controller 111 may access the OTP memory 120. For example, the first request REQ1 may be the read request for the first region R1. In this case, the OTP access controller 111 may perform the read operation on the first region R1 and may then send data obtained through the read operation to the first core C1. Meanwhile, for example, the first request REQ1 may be the write request for the first region R1. In this case, for example, the OTP access controller 111 may store write data sent from the first core C1 in the first region R1.

Unlike the above description, for example, the first request REQ1 may be the read or write request for the third region R3. In this case, the OTP access controller 111 may determine that the first core C1 does not have the authority to access the third region R3, through the OTP access table 113. Accordingly, for example, the OTP access controller 111 may not permit the access of the first core C1 and may send an error message to the first core C1.

Referring to FIG. 10B, in operation 1051, the second core C2 may send a second request REQ2 to the OTP access controller 111. The second request REQ2 may be a request corresponding to the third region R3 of the OTP memory 120. For example, the second request REQ2 may be a read or write request for the third region R3.

Meanwhile, for example, the second core C2 may be in a state where access authentication for the OTP memory 120 is not completed.

In operation 1052, the OTP access controller 111 may check the OTP access table 113. The OTP access controller 111 may determine that access authentication for the second core C2 is not completed. Accordingly, the OTP access controller 111 may not permit the access of the second core C2 to the OTP memory 120.

In operation 1053, the OTP access controller 111 may send an error message to the second core C2. For example, the error message may include information indicating that the access authentication for the second core C2 is not completed. For example, the second core C2 may perform access authentication for the OTP memory 120, in response to the error message.

In a same or another embodiment, the OTP access controller 111 may change a region in which the access authority is permitted to the first core C1 and the second core C2. For example, the access authentication for the first core C1 may be in a completed state, and the first core C1 may have the authority to access the first region R1 and the second region R2. In this regard, the OTP access controller 111 may change a region, which the first core C1 is capable of accessing, in the OTP access table 113. In this case, a region in which the access authority is permitted to the first core C1 may be changed.

In a same or another embodiment, while the memory device 100 operates, the second region R2 may be full of the sharing data SD. In this case, the OTP access controller 111 may check a residual region, in which data are not stored and the access authority is not permitted to the first and second cores C1 and C2, by referring to the OTP access table 113. The OTP access controller 111 may add the residual region to the OTP access table 113 as a region(s) which the first core C1 and the second core C2 are is capable of accessing. Accordingly, the OTP access controller 111 may additionally assign the authority to access the residual region to the first core C1 and the second core C2.

Figure 11:
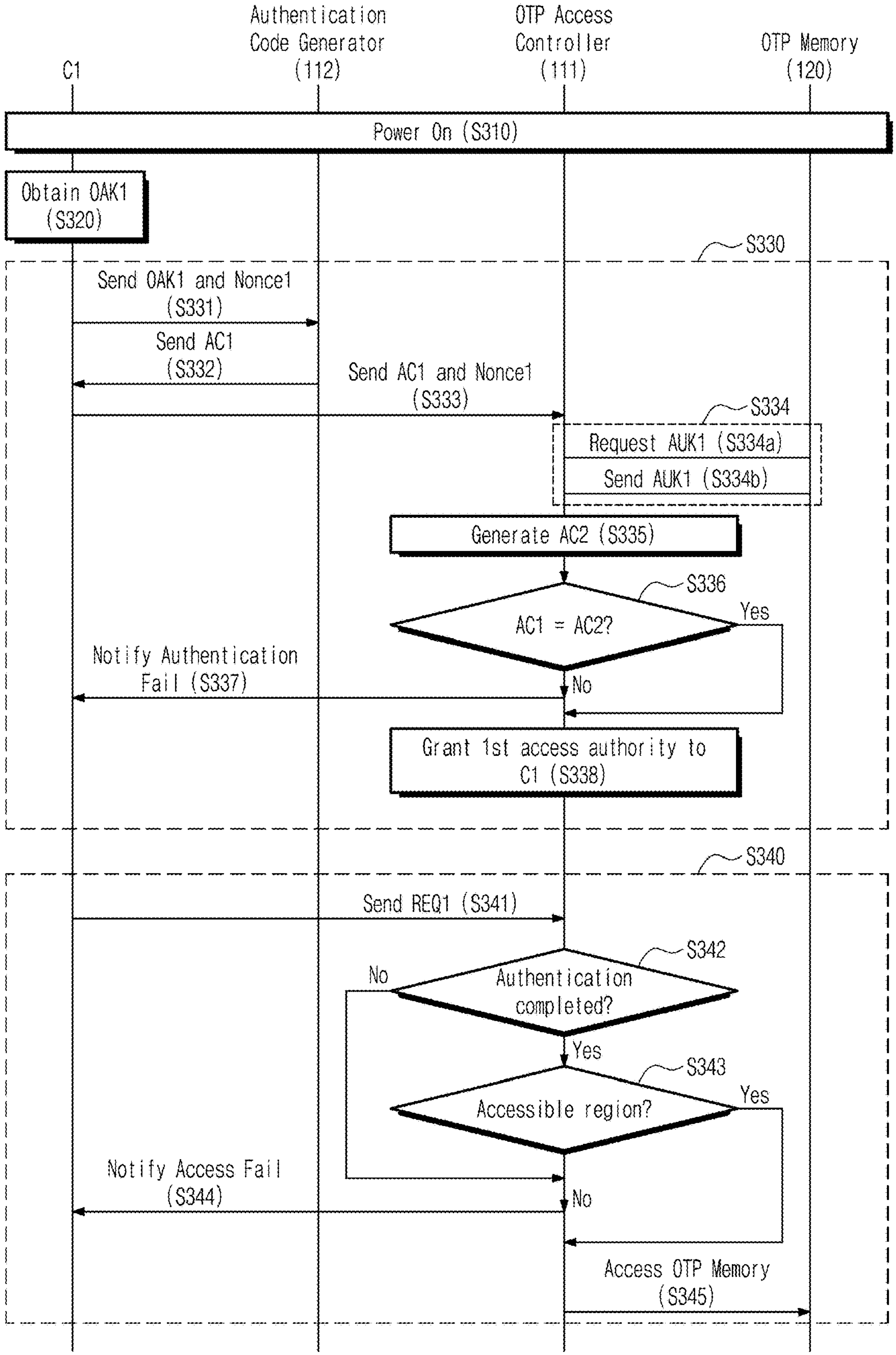
FIG. 11 is a workflow diagram for illustrating an operation of a memory device of FIG. 1.

FIG. 11 is a diagram for describing an operation of a memory device of FIG. 1. FIG. 11 will be described with reference to FIG. 3. Referring to FIG. 11, in operation S310, the memory device 100 may be powered on.

In operation S320, the first core C1 may obtain the first OTP access key OAK1. For example, the first core C1 may read the boot code or the firmware code stored in the ROM 114 and may obtain the first OTP access key OAK1.

In operation S330, access authentication for the first core C1 may be performed. In an embodiment, in operation S331, the first core C1 may generate the first nonce Nonce1 and may then send the first nonce Nonce1 and the first OTP access key OAK1 to the authentication code generator 112.

The authentication code generator 112 may generate the first authentication code AC1 by performing a hash operation on the first nonce Nonce1 and the first OTP access key OAK1. As described above, the authentication code generator 112 may generate the first authentication code AC1 by using the HMAC algorithm.

In operation S332, the authentication code generator 112 may send the first authentication code AC1 to the first core C1.

In operation S333, the first core C1 may send the first nonce AC1 and the first authentication code AC1 to the OTP access controller 111.

In operation S334, the OTP access controller 111 may obtain the first authentication key AUK1 from the OTP memory 120. For example, the OTP access controller 111 may request the first authentication key AUK1 from the OTP memory 120. The OTP memory 120 may send the first authentication key AUK1 to the OTP access controller 111 in response to the request.

In a same or another embodiment, the first authentication key AUK1 may be the same as the first OTP access key OAK1.

In operation S335, the OTP access controller 111 may generate the second authentication code AC2. For example, the OTP access controller 111 may generate the second authentication code AC2 by performing a hash operation on the first authentication key AUK1 and the first nonce Nonce1. In a same or another embodiment, the OTP access controller 111 may generate the second authentication code AC2 by using the HMAC algorithm.

In operation S336, the OTP access controller 111 may determine whether the first authentication code AC1 and the second authentication code AC2 coincide with each other. When the first authentication code AC1 and the second authentication code AC2 do not coincide with each other, the OTP access controller 111 may notify the first core C1 that the access authentication is failed (operation S337). When the first authentication code AC1 and the second authentication code AC2 coincide with each other, the OTP access controller 111 may determine that the first OTP access key OAK1 is the same as the first authentication key AUK1. When the first authentication code AC1 and the second authentication code AC2 coincide with each other, the OTP access controller 111 may perform operation S338.

In operation S338, the OTP access controller 111 may assign a first access authority to the first core C1. For example, the first access authority may mean an authority to access the first region R1 and the second region R2 of the OTP memory 120. For example, the OTP access controller 111 may update the OTP access table 113 such that the first access authority is assigned to the first core C1. In an embodiment, the OTP access controller 111 may assign the first access authority to the first core C1 by updating the OTP access table 113 such that there is marked that the access authentication for the first core C1 is completed.

In operation S340, the memory device 100 may access the OTP memory 120. For example, the first core C1 of the memory device 100 may access the OTP memory 120.

In an embodiment, in operation S341, the first core C1 may send the first request REQ1 to the OTP access controller 111. For example, the first request REQ1 may be a read or write request for the OTP memory 120.

In operation S342, the OTP access controller 111 may determine whether the access authentication for the first core C1 is completed. When the access authentication is completed, the OTP access controller 111 may perform operation S343. When the access authentication is not completed, the OTP access controller 111 may perform operation S344.

In operation S343, the OTP access controller 111 may determine whether an address corresponding to the first request REQ1 belongs to a region accessible by the first core C1. When the address does not belong to the accessible region, the OTP access controller 111 may notify the first core C1 of the access failure. When the address belongs to the accessible region, the OTP access controller 111 may perform operation S345.

In operation S345, the OTP access controller 111 may access the OTP memory 120. For example, the OTP access controller 111 may request the read or write operation from the OTP memory 120. For example, the OTP access controller 111 may send the first request REQ1 from the first core C1 to the OTP memory 120.

As described above, according to a same or another embodiment of the present disclosure, the memory device 100 may assign an authority to access a region(s) of the OTP memory 120 to each of the first and second cores C1 and C2, based on a key (e.g., an OTP access key and an authentication key) corresponding to each of the first and second cores C1 and C2. Accordingly, the memory device 100 may distinguish regions of the OTP memory 120, which the first and second cores C1 and C2 are capable of accessing, and may prevent sharing data from being stored in duplicate. As understood from the above description, according to a same or another embodiment of the present disclosure, the memory device 100 with improved performance and an operating method of the memory device 100 may be provided.

Figure 12:
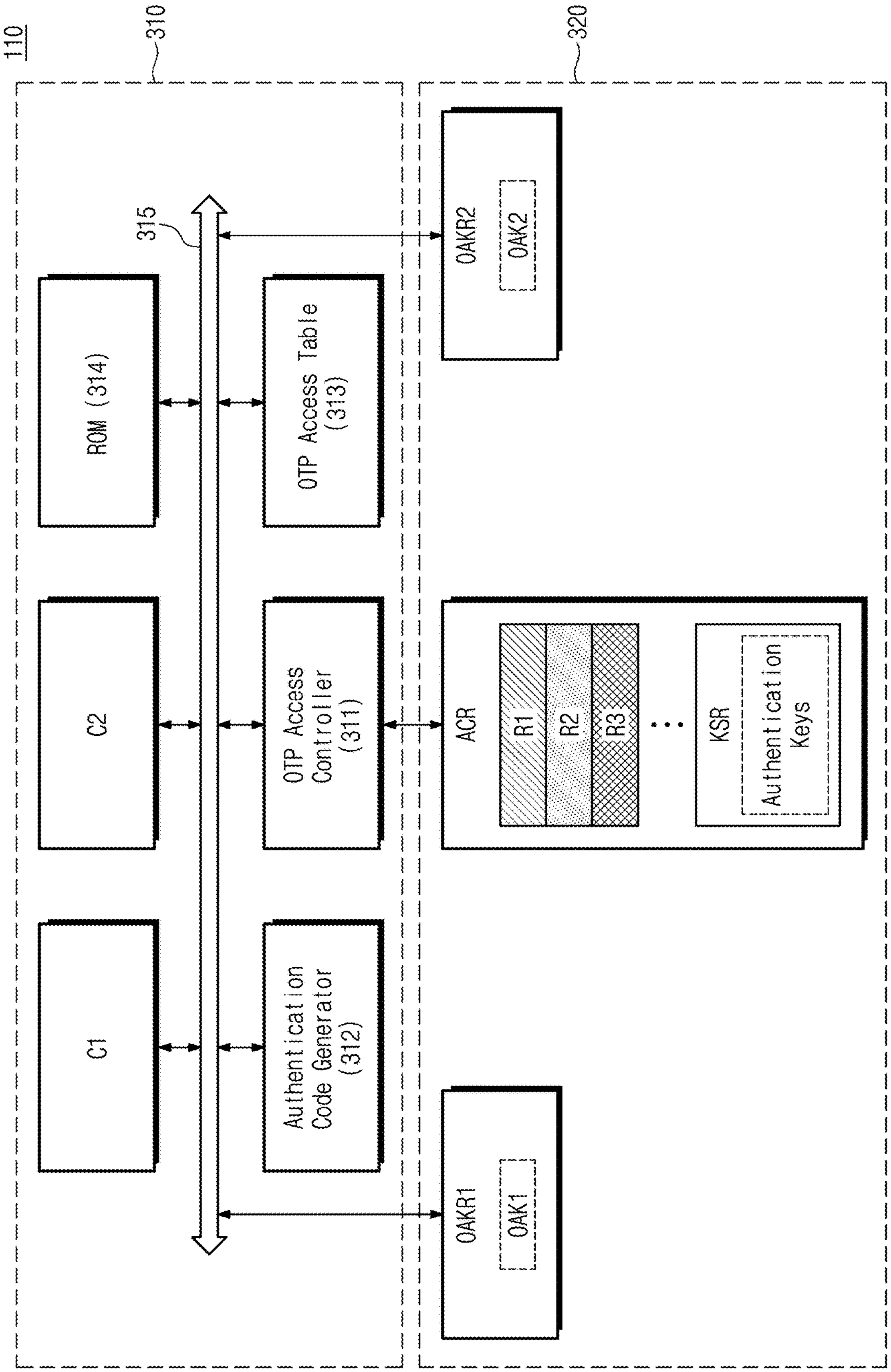
FIG. 12 is a diagram illustrating a memory device according to an embodiment of the present disclosure.

FIG. 12 is a diagram for describing another example of a memory device 300 according to an embodiment of the present disclosure. Referring to FIG. 12, the memory device 300 may include a memory controller 310 and an OTP memory 320. The memory controller 310 may correspond to the memory controller 110 of FIGS. 1 and 3, and the OTP memory 320 may correspond to the OTP memory 120 of FIG. 1.

The memory controller 310 may include a first core C1, a second core C2, an OTP access controller 311, an authentication code generator 312, an OTP access table 313, a ROM 314, and a system bus 315. As described above, the OTP access controller 311 may control the access of the cores C1 and C2 to the OTP memory 320 based on the OTP access keys OAK1 and OAK2.

The OTP memory 320 may include a first OTP access key storage region OAKR1, a second OTP access key storage region OAKR2, and an access control region ACR. The access control region ACR may include first to third regions R1 to R3 and a key storage region KSR.

Unlike the example illustrated in FIG. 3, in the example of FIG. 12, the first OTP access key OAK1 may be stored in the first OTP access key storage region OAKR1, and the second OTP access key OAK2 may be stored in the second OTP access key storage region OAKR2. Meanwhile, the first OTP access key storage region OAKR1 may be physically connected to the first core C1 through the system bus 315. The second OTP access key storage region OAKR2 may be physically connected to the second core C2 through the system bus 315.

Accordingly, the first core C1 may only access the first OTP access key storage region OAKR1 and may be incapable of accessing the second OTP access key storage region OAKR2. Also, the second core C2 may only access the second OTP access key storage region OAKR2 and may be incapable of accessing the first OTP access key storage region OAKR1. Meanwhile, the OTP access controller 311 may be incapable of accessing the first OTP access key storage region OAKR1 and the second OTP access key storage region OAKR2.

That is, according to the example of FIG. 12, the OTP access keys OAK1 and OAK2 may be stored in the OTP memory 320, not the ROM 314.

In the example of FIG. 12, when the memory device 300 is powered on, the first core C1 may access the first OTP access key storage region OAKR1 to obtain the first OTP access key OAK1. Afterwards, the first core C1 may generate the first nonce Nonce1 and may then send the first nonce Nonce1 and the first OTP access key OAK1 to the authentication code generator 312.

The authentication code generator 312 may generate the first authentication code AC1 based on the first nonce Nonce1 and the first OTP access key OAK1. The authentication code generator 312 may send the first authentication code AC1 to the first core C1.

Afterwards, the first core C1 may send the first OTP authentication code AC1 and the first nonce Nonce1 to the OTP access controller 311. The OTP access controller 311 may fetch the first authentication key AUK1 from the key storage region KSR included in the access control region ACR of the OTP memory 320. The OTP access controller 311 may generate the second authentication code AC2 based on the first authentication key AUK1 and the first nonce Nonce1. The OTP access controller 311 may determine whether the second authentication code AC2 and the first authentication code AC1 coincide with each other. When the first authentication code AC1 and the second authentication code AC2 coincide with each other, the OTP access controller 311 may assign a first access authority to access the first region R1 and the second region R2 to the first core C1.

Meanwhile, the second core C2 may perform access authentication with the OTP access controller 311 in a manner similar to that of the first core C1. The OTP access controller 311 may assign a second access authority to access the second region R2 and the third region R3 to the second core C2 through an access authentication procedure of the second core C2.

Meanwhile, the second region R2 may be a region in which sharing data shared by the first core C1 and the second core C2 are stored. Accordingly, the sharing data may not be stored in a plurality of regions (e.g., the first region R1 and the third region R3) of the access control region ACR in duplicate. This may mean that the storage space efficiency of the OTP memory 320 is improved.

Figure 13:
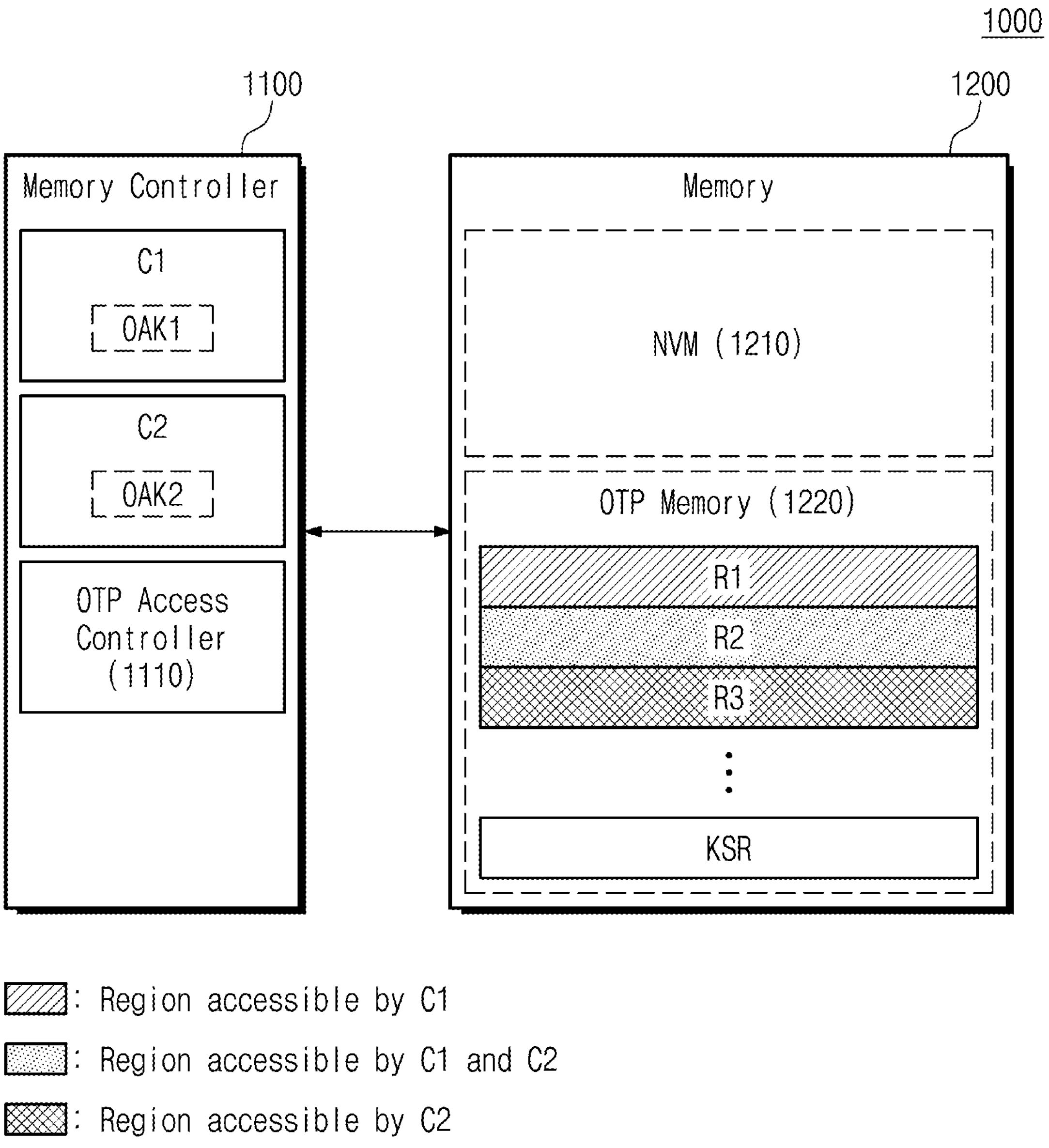
FIG. 13 is a diagram illustrating a memory device according to an embodiment of the present disclosure.

FIG. 13 is a diagram for describing another example of a memory device according to an embodiment of the present disclosure. Referring to FIG. 13, a memory device 1000 may include a memory controller 1100 and a memory 1200. In an embodiment, the memory device 1000 may be a high-capacity storage medium such as a solid state drive (SSD), a memory card, or a memory stick.

The memory controller 1100 may control all the operations of the memory device 1000. The memory controller 1100 may read data stored in the memory 1200 based on a request from an external host (not illustrated). In an embodiment, for an efficient operation of the memory device 1000, the memory controller 1100 may perform various maintenance operations (e.g., wear-leveling, garbage collection, and bad block management) for a non-volatile memory device 1210.

The memory controller 1100 may include a first core C1, a second core C2, and an OTP access controller 1110. The first core C1, the second core C2, and the OTP access controller 1110 correspond to the first core C1, the second core C2, and the OTP access controller 111 of FIG. 1. The OTP access controller 1110 may control the access of the first core C1 to an OTP memory 1220 based on the first OTP access key OAK1. Also, the OTP access controller 1110 may control the access of the second core C2 to the OTP memory 1220 based on the second OTP access key OAK2.

The memory 1200 may include the non-volatile memory device (NVM) 1210 and the OTP memory 1220. Under control of the memory controller 1100, the non-volatile memory device 1210 may store data or may output the stored data. In an embodiment, the non-volatile memory device 1210 may include a NAND flash memory. However, the present disclosure is not limited thereto. The OTP memory 1220 may correspond to the OTP memory 120 of FIG. 1.

In an embodiment, the non-volatile memory device 1210 may include a memory cell array including a plurality of memory cells. In an embodiment, the OTP memory 1220 may be a partial region included in the memory cell array of the non-volatile memory device 1210.

A memory device according to an embodiment of the present disclosure may include a plurality of cores, an OTP memory, and an OTP access controller. Sharing data which are shared by the plurality of cores may be stored in a specific region of the OTP memory. The plurality of cores may access the specific region under control of the OTP access controller. In this case, the sharing data may not be stored in the plurality of regions of the OTP memory in duplicate. This may mean that the memory device efficiently manages the storage space of the OTP memory. Accordingly, a memory device with improved performance and an operating method thereof may be provided.

While the present disclosure has been described with reference to embodiments thereof, it will be apparent to those of ordinary skill in the art that various changes and modifications may be made thereto without departing from the spirit and scope of the present disclosure as set forth in the following claims.

What is claimed is:

1. A memory device comprising:
a one-time programmable (OTP) memory comprising a plurality of regions;
a memory controller comprising more than one core, each of the more than one core associated with a respective OTP access key; and
an OTP access controller configured to:
assign a first access authority to a first core from the more than one core to access a first subset of regions from the plurality of regions based on a first OTP access key and a first authentication key, wherein the first OTP access key is associated with the first core; and
assign a second access authority to a second core from the more than one core to access a second subset of regions from the plurality of regions based on a second OTP access key and a second authentication key, wherein the second OTP access key is associated with the second core,
wherein the first subset of regions and the second subset of regions comprise a common region that can be accessed based on the first access authority and the second access authority.

2. The memory device of claim 1, wherein the common region is a region in which sharing data shared by the first core and the second core are stored.

3. The memory device of claim 1, wherein the OTP memory further comprises:
a key region storing the first authentication key and the second authentication key,
wherein the first authentication key is equal to the first OTP access key and the second authentication key is equal to the second OTP access key.

4. The memory device of claim 1, wherein the memory controller is configured to:
perform first access authentication for authenticating an access of the first core to the first subset of regions of the OTP memory based on the first OTP access key and the first authentication key;
determine whether the first core corresponds to the first OTP access key, through the first access authentication; and
assign the first access authority to the first core, through the first access authentication.

5. The memory device of claim 4, wherein the memory controller further comprises:
an authentication code generator configured to generate a first authentication code for the first access authentication.

6. The memory device of claim 5, wherein the first core is configured to:
generate a first nonce for the first access authentication; and
send the first nonce and the first OTP access key to the authentication code generator, and
wherein the authentication code generator is configured to:
generate the first authentication code based on the first nonce and the first OTP access key.

7. The memory device of claim 6, wherein the first core is further configured to:
obtain the first authentication code from the authentication code generator; and
send the first nonce and the first authentication code to the OTP access controller, and
wherein the OTP access controller is further configured to:
obtain the first authentication key from the OTP memory; and
generate a second authentication code for the first access authentication based on the first authentication code and the first nonce.

8. The memory device of claim 7, wherein the OTP access controller is further configured to:
compare the first authentication code and the second authentication code;
determine that the first OTP access key and the first authentication key are equal, based on that the first authentication code and the second authentication code being equal; and
assign the first access authority to the first core.

9. The memory device of claim 5, wherein the memory controller further comprises:
a read only memory (ROM) in which the first OTP access key and the second OTP access key are stored in advance; and
a system bus connected to the ROM, the first core, the second core, the authentication code generator, and the OTP access controller.

10. The memory device of claim 4, wherein the memory controller further comprises:
an OTP access table comprising first information about a region accessible by the first core from among the plurality of regions of the OTP memory and second information about whether the first access authentication is completed.

11. The memory device of claim 10, wherein the first core is further configured to, after the first access authentication is completed, the first core sends a read request or a write request for the OTP memory to the OTP access controller, and
wherein the OTP access controller is further configured to perform a read operation or a write operation on the OTP memory in response to the read request or the write request, without performing an authentication procedure for the first core.

12. The memory device of claim 11, wherein the read request or the write request is a request for the first subset of regions or the second subset of regions.

13. An operating method of a memory device, the memory device comprising a memory controller and a one-time programmable (OTP) memory, the method comprising:
generating a first authentication code associated with access authentication for authenticating an access of a first core of the memory controller to the OTP memory, based on a first OTP access key corresponding to the first core;
generating a second authentication code associated with the access authentication, based on a first authentication key stored in a key region of the memory controller, the first authentication key corresponding to the first OTP access key;
comparing the first authentication code and the second authentication code; and
assigning an access authority to the first core to access a first subset of regions of the OTP memory, based on that the first authentication code and the second authentication code being equal, wherein the first subset of regions comprises a region storing sharing data that is shared by the first core and a second core of the memory controller, wherein the second core is associated with a second OTP access key and a second authentication key, wherein the second OTP access key and the second authentication key are used for assigning an access authority to the second core to access a second subset of regions of the OTP memory.

14. The method of claim 13, wherein the generating of the first authentication code comprises:

generating a first nonce; and generating the first authentication code based on the first nonce and the first OTP access key.

15. The method of claim 14, wherein the generating of the second authentication code comprises:

obtaining the first authentication key from the OTP memory; and generating the second authentication code based on the first nonce and the first authentication key.

16. The method of claim 14, wherein the memory controller comprises:

an OTP access table comprising first information about a region accessible by the first core from among a plurality of regions of the OTP memory and second information about whether the access authentication for the first core is completed.

17. The method of claim 16, wherein the assigning of the access authority comprises:

marking, in the OTP access table, that the access authentication for the first core is completed.

18. A memory device comprising:

a memory controller comprising a plurality of cores, each of the plurality of cores associated with a respective OTP access key; and a one-time programmable (OTP) memory comprising a plurality of regions, the plurality of regions comprising:

a first subset of regions that stores data only a first core uses, a second subset of regions that stores data which the first core and a second core use, and a third subset of regions that stores data which only the second core uses, wherein the memory controller is configured to:

assign a first access authority to access the first subset of regions and the second subset of regions to the first core based on a first OTP access key corresponding to the first core and a first authentication key corresponding to the first OTP access key; and assign a second access authority to access the second subset of regions and the third subset of regions to the second core based on a second OTP access key corresponding to the second core and a second authentication key corresponding to the second OTP access key.

19. The memory device of claim 18, wherein the OTP memory further comprises:

a key region in which the first authentication key and the second authentication key are stored, and wherein the first authentication key is equal to the first OTP access key and the second authentication key is equal to the second OTP access key.

20. The memory device of claim 19, wherein the memory controller is further configured to:

generate a first nonce through the first core;

obtain the first authentication key;

generate a first authentication code based on the first OTP access key and the first nonce;

generate a second authentication code based on the first authentication key and the first nonce; and assign the first access authority to the first core based on that the first authentication code and the second authentication code being equal.

* * * * *